US012767505B2

(12) United States Patent
Himmelsbach et al.

(10) Patent No.: US 12,767,505 B2
(45) Date of Patent: Oct. 20, 2026

(54) SUPPORT DEVICE FOR A LIFTING PLATFORM, LIFTING PLATFORM WITH A SUPPORT DEVICE

(71) Applicant: Nussbaum Automotive Lifts GmbH, Kehl-Bodersweier (DE)

(72) Inventors: Michael Himmelsbach, Seelbach (DE); Ludwig Huber, Willstatt (DE)

(73) Assignee: Nussbaum Automotive Lifts GmbH, Kehl-Badersweier (DE)

(*) Notice: Subject to any disclaimer, the term of this patent is extended or adjusted under 35 U.S.C. 154(b) by 0 days.

(21) Appl. No.: 19/107,120

(22) PCT Filed: Sep. 7, 2023

(86) PCT No.: PCT/EP2023/074601
§ 371 (c)(1),
(2) Date: Feb. 27, 2025

(87) PCT Pub. No.: WO2024/056518
PCT Pub. Date: Mar. 21, 2024

(65) Prior Publication Data

US 2026/0062266 A1 Mar. 5, 2026

(30) Foreign Application Priority Data

Sep. 12, 2022 (DE) ........................ 202022105127.5

(51) Int. Cl.
*B66F 7/28* (2006.01)
*B66F 7/02* (2006.01)

(52) U.S. Cl.
CPC . *B66F 7/28* (2013.01); *B66F 7/02* (2013.01)

(58) Field of Classification Search
CPC .................................... B66F 7/28; B66F 7/02
See application file for complete search history.

(56) References Cited

U.S. PATENT DOCUMENTS

| | | | | |
|---|---|---|---|---|
| 2,696,969 | A | 12/1954 | Branick | |
| 11,820,632 | B2 * | 11/2023 | Kritzer | B66F 3/38 |
| 2018/0201490 | A1 | 7/2018 | Ringler et al. | |
| 2022/0017342 | A1 | 1/2022 | Kritzer | |

FOREIGN PATENT DOCUMENTS

| | | | | |
|---|---|---|---|---|
| DE | 202024103304 U1 | * 7/2024 | B66F 7/28 |
| KR | 20080097509 A | * 11/2008 | B66F 17/00 |
| KR | 20170133939 A | * 12/2017 | B66F 7/28 |

* cited by examiner

*Primary Examiner* — Diem M Tran
(74) *Attorney, Agent, or Firm* — Volpe Koenig

(57) ABSTRACT

A support device (1) for a lifting platform, with a support element (4), which is designed to bear a load to be lifted, and with a hollow bushing (5), which is fastenable on an outer side to the lifting platform in a continuously adjustable manner, and in which the hollow bushing (5) has a cavity, (14) in order to receive the support element (4) via a rectilinear insertion movement (8) along an insertion axis (13). A stop element (15) arranged in the cavity (14) is designed in such a way that an insertion depth (10, 11) of the support element (4) in the hollow bushing (5) can be set in a stepwise manner and the insertion depth (10, 11) is dependent on a relative rotational position between the support element (4) and the hollow sleeve (5) about the insertion axis (13).

15 Claims, 11 Drawing Sheets

SUPPORT DEVICE FOR A LIFTING PLATFORM, LIFTING PLATFORM WITH A SUPPORT DEVICE

CROSS-REFERENCE TO RELATED APPLICATIONS

This application is a 371 National Phase of PCT/EP2023/074601. Filed Sep. 7, 2023, which claims priority from German Patent Application No. 20 2022 105 127.5, filed Sep. 12, 2022, both of which are incorporated herein by reference as if fully set forth.

TECHNICAL FIELD

The invention relates to a support device for a lifting platform and a lifting platform with a support device.

BACKGROUND

In lifting platforms, in particular in vehicle lifting platforms, a support device of the type mentioned at the outset may serve to bear a load to be lifted, preferably a vehicle. The load can be moved along a lifting axis, held in a lifted state and lowered again by means of a hydraulic unit of the lifting platform. The lifting platform is typically equipped with a plurality of support devices in order to bear the load at a plurality of force application points.

In principle, it is desirable to use a lifting platform with the support device to lift different loads, which may differ in shape. If the loads to be lifted are vehicles, they may have, in particular, different ground clearances and chassis types. In this regard, vans or sport utility vehicles (SUVs) have, for example, higher ground clearance than sports cars. If a vehicle with high ground clearance is to be lifted, the support device typically has to be moved along the lifting axis until contact is established between the support device and the vehicle. If a multiplicity of vehicles is to be lifted over the service life of the lifting platform, the time and energy expended to adjust the support device in this manner are considerable.

There is therefore a need for a support device which is intended for a lifting platform and the height of which can be adjusted independently of a lifting movement of the lifting platform. It is also desirable for the support device to be cost-effective to produce and have a high level of reliability.

SUMMARY

The object on which the invention is based is to propose a support device which meets the aforementioned requirements.

The object is achieved by a support device and by a lifting platform having one or more of the features disclosed herein. Advantageous developments that form the subject matter of the present disclosure follow.

The support device according to the invention for a lifting platform comprises a support element, which is designed to bear a load to be lifted, and a hollow bushing, on the outer side of which the hollow bushing is fastenable to the lifting platform in a continuously adjustable manner. The hollow bushing also has a cavity, in order to receive the support element by means of a rectilinear insertion movement along an insertion axis. A stop element arranged in the cavity is designed in such a way that an insertion depth of the support element in the cavity can be set in a stepwise manner, wherein the insertion depth depends on a relative rotational position between the support element and the hollow bushing about the insertion axis.

The support device according to the invention makes it possible to adjust the hollow bushing continuously relative to the lifting platform and to adjust the support element in a stepwise manner relative to the hollow bushing.

For continuous adjustment, the outer side of the hollow bushing may have an external thread, by means of which the hollow bushing is fastenable to the lifting platform in a continuously adjustable manner with a screwing movement. In particular, the hollow bushing can be displaced, alone or together with the support element, by means of a screwing movement along a screwing axis. The hollow bushing can preferably be arranged on a support arm of a lifting platform, wherein the support arm has an internal thread corresponding to the external thread. In particular, the support arm can be arranged on the lifting platform so as to be pivotable in a horizontal plane in order to be able to position the support device underneath the load to be lifted. The screwing movement allows a relative position of the support device in relation to the support arm of the lifting platform to be changed as required and in a freely settable manner. In particular, the continuous adjustment of the hollow bushing makes it possible to make fine adjustments to the position of the support element along the lifting axis of the lifting platform.

For stepwise adjustment, the support element can be fitted into the hollow bushing in different rotational positions and can project from the hollow bushing at different heights depending on the rotational position. This allows rough adjustments to be made to the position of the support element along the lifting axis of the lifting platform by inserting the support element into the hollow bushing in different rotational positions.

The construction according to the invention makes it possible to initially move the support device, and in particular the position of the support element, in a stepwise manner along the lifting axis of the lifting platform from a first position toward a desired second position, wherein there may remain a distance between the support element and the load to be lifted. This distance may subsequently be compensated for by continuous adjustment to reach the second position. It is within the scope of the invention that the support element may also be adjusted in reverse order, wherein a continuous adjustment is initially carried out, followed by a stepwise adjustment.

A screwing axis may be defined by the course of the external thread and preferably extends parallel to a center axis of the hollow bushing. The insertion axis, along which the hollow bushing and the support element may be fitted together by means of a rectilinear insertion movement, preferably runs parallel to the screwing axis. In particular, in a state of the support device in which the hollow bushing is fastened to the lifting platform, the screwing axis and the insertion axis run parallel to the lifting axis of the lifting platform.

Within the scope of the invention, the stop element arranged in the cavity represents a means of delimiting the insertion movement by means of which the support element can be placed into the cavity, wherein a desired insertion depth can be set. In a simple embodiment, the stop element may have a stepped shape with a first and a second step, which are arranged in such a way that the support element rests on the first or the second step, depending on the relative rotational position about the insertion axis. It is of course within the scope of the invention that, alternatively, it is the support element that has a stepped shape and rests, via the first step or the second step, depending on the rotational position, on the stop element.

In principle, the insertion depth may be considered to be any desired distance along the insertion axis between any desired point on the support element and any desired point on the hollow bushing. For example, the insertion depth may therefore describe a distance between an upper edge of the hollow bushing and an end face of the support element along the insertion axis. Preferably, the insertion depth may indicate the distance by which the support element projects from the cavity of the hollow bushing in different rotational positions.

Within the scope of the invention, the support element represents a load-bearing structural component which preferably has at least one contact surface, via which an adjusting force and/or adjusting movement of the lifting platform can be transmitted to the load to be lifted. The support element is not limited to a specific configuration.

In an advantageous development, the support element comprises a support member, which is in particular detachably connected to the support element and preferably has a support plate and/or a form-fitting element, in particular a support mandrel.

In a configuration in which the support element comprises a support plate, the latter may be coated with an adhesive material in order to secure, in a force-fitting manner, a load resting thereon against slipping. In a configuration in which the support element has a form-fitting element, the latter may, at least partially, have a shape selected in such a way that it is able to bear a load in a centerable manner and to hold this load in a form-fitting manner. The form-fitting element that may be used is, as mentioned above, a support mandrel, which has a conical or cylindrical shape. However, the form-fitting element need not only be designed as a support mandrel, and can also be designed for example as a cuboid and/or as a bead and/or as a thin-walled web, which are provided in each case in order to engage in a recess corresponding thereto on the load to be lifted and to fix the latter in a form-fitting manner. It is also within the scope of the advantageous development that a plurality of form-fitting elements is provided.

Preferably, the support element is designed to be interchangeable. For this purpose, the support element and the support member may have two mutually corresponding mechanical interfaces. For example, the support element may have a depression and the support member may have a protrusion corresponding thereto, in order to be detachably connected to each other.

Within the scope of the invention, the hollow bushing represents a force-transmitting bearing element which serves to receive the support element and to attach the support element to the lifting platform. The adjusting movement and/or adjusting force which can be exerted by the lifting platform can be transmitted to the support element by means of the hollow bushing. The hollow bushing is preferably designed as a substantially thin-walled and, in particular, rotationally symmetrical component. An encircling inner wall delimits the cavity in the radial direction and preferably serves to guide the support element along the insertion axis. Preferably, the hollow bushing has a base which closes the cavity on one side in the axial direction. The external thread preferably extends substantially over the full height of the hollow bushing. In addition, the embodiment of the hollow bushing in which an external thread is provided is not limited to a specific external thread configuration with a thread lead or a thread type.

In an advantageous development, the stop element has a recess, wherein the support element, in a first relative rotational position, rests on the stop element in the region of an edge of the recess and, in a second relative rotational position, engages in the recess.

The fact that the recess of the stop element can serve to guide the support element when the latter is inserted into the cavity of the hollow bushing can be regarded as an advantage of the development described above. This allows the stepwise adjustment of the support device to be simplified and allows the support device to retain a simple construction. In addition, the settable insertion depths of the support element can be set on the basis of the shape of the recess.

In an advantageous development, the stop element is designed at least partially as a flat part, on the end face of which the recess is arranged, wherein the edge of the recess delimits a first bearing surface of the stop element, and wherein a bottom of the recess comprises a second bearing surface of the stop element. In the first relative rotational position, the support element rests on the first bearing surface. In the second relative rotational position, the support element engages in the recess and rests on the second bearing surface.

According to the development described above, the first bearing surface and the second bearing surface in the second or first rotational positions limit the rectilinear insertion movement of the support element relative to the hollow bushing. Accordingly, the configuration of the stop element allows at least two settable insertion depths to be constructionally defined, in particular on the basis of a distance between the first and second bearing surfaces.

In an advantageous development, the support element and the stop element are rotated by 90 degrees relative to each other between the first and second rotational positions. A stepwise adjustment of the height of the support device may for example be carried out by removing a support element, which is already inserted in the cavity, from the cavity along the insertion axis, rotating it by 90 degrees relative to the hollow bushing and subsequently introducing it into the cavity along the insertion axis, wherein the insertion depth is increased or decreased relative to the original state.

In an advantageous development, the stop element is interchangeably arranged in the cavity. This makes it possible to provide a plurality of stop elements which can be introduced into the cavity selectively in order to be able to set different insertion depths for the support element. Preferably, the support element of the support device may be designed to be interchangeable.

In another configuration of the support device according to the invention, in addition to a support element, which is designed to bear a load to be lifted, and the hollow bushing, the outer side of which is fastenable to the lifting platform in a continuously adjustable manner, the support device also has a spacer element, which may be arranged between the support element and the hollow bushing. The hollow bushing has a first cavity, in order to receive the spacer element along a first insertion axis, wherein a first stop element arranged in the first cavity is designed in such a way that a first insertion depth of the spacer element in the hollow bushing can be set in a stepwise manner and the first insertion depth is dependent on a relative rotational position between the spacer element and the hollow bushing. Furthermore, the spacer element has a second cavity, in order to receive the support element at a second insertion depth.

Preferably, the support element and/or the hollow bushing is designed in accordance with the support element and/or the hollow bushing of the support device according to the invention without a spacer element. In this respect, the above statements concerning the configurations according to the invention and advantageous configurations of the support device, in particular its hollow bushing or support element, apply accordingly.

In addition to the support element and the hollow bushing, the spacer element represents a component, the form and dimensions of which are selected in order to be able to change the position of the support element in a stepwise manner relative to the lifting platform. This makes it possible to shorten the lifting distance of a lifting platform in which the support device is used, for example if the load to be lifted is a vehicle with high ground clearance. Advantageously, the spacer element between the support element and the hollow bushing can be removed as required. This makes it possible to set the support device to lift vehicles with lower ground clearance.

The first insertion depth may be considered to be a relative position between the spacer element and the hollow bushing along the first insertion axis. The second insertion depth describes a relative position between the support element and the spacer element, in particular along a second insertion axis or a guide axis, which are explained in detail below. The second insertion depth may be constructionally determined and independent of the relative rotational position between the support element and the spacer element. In an advantageous development, however, the second cavity is designed to receive the support element along a second insertion axis, wherein a second stop element arranged in the second cavity is designed in such a way that a the second insertion depth of the support element in the second cavity can be set in a stepwise manner and the second insertion depth is dependent on a relative rotational position between the support element and the spacer element about the second insertion axis.

Preferably, the spacer element is designed to be at least partially identical to a region of the hollow bushing into which the support element can be fitted in order to set a rotational-position-dependent first insertion depth. In particular, the spacer element may have a bushing portion and an insertion portion, wherein the insertion portion is provided in order to be received in the first cavity of the hollow bushing, and the bushing portion has the second cavity, in order to receive the support element. In particular, the spacer element may be designed in the manner of a stepped cylinder, wherein the insertion portion has smaller radial dimensions than the bushing portion. Preferably, the support element and the spacer element can be fitted together as required by means of a rectilinear insertion movement along the second insertion axis, and separated from one another in the reverse direction of movement.

In a further advantageous development, the support element is preferably adjustably guided in the spacer element along a guide axis. At least one spring element is provided in order, in a tensioned state, to exert a spring force on the support element along the guide axis.

An advantage associated with using a spring element is that, when the support device is lifted by means of the lifting platform, contact can be established between the support element and the load to be lifted even before the load is lifted. As a result, it is possible to check in a simple manner whether the support element is in the desired position in order to lift the load safely. If the support element is designed as a support mandrel or another form-fitting support member, form-fitting contact can be established with the load to be lifted by means of the spring element even before the lifting movement of the load, this form-fitting contact enabling the lifting movement to be carried out in a particularly safe manner. In particular, this allows legal provisions relating to lifting platforms for vehicles, which frequently require a form fit of this type, to be implemented in a particularly uncomplicated manner.

Preferably, more than one spring element is provided in order to exert the spring force on the support element. In particular, two spring elements, which are in particular mechanically connected in series, may be provided. These two spring elements may be mechanically coupled with each other by means of a force transmission element. The force transmission element may be, in particular, a bolt, at the ends of which the two spring elements are arranged, wherein one of the spring elements is supported against the spacer element and the other spring element is supported against the support element. In this case, the force transmission element makes it possible to select and set the lengths of the spring elements and their spring deflection in accordance with requirements.

In the advantageous development of the support device comprising the spring element, the second insertion depth may be considered to be a relative position between the support element and the spacer element, the spring element being fully compressed in this position. The support element may rest on the spring element and preferably on the second stop element arranged in the second cavity. It is within the scope of the advantageous development that the support element can be taken out of the spacer element and placed into the spacer element along the second insertion axis at a rotational-position-dependent second insertion depth. It is also within the scope of the advantageous development that the second insertion depth is independent of the relative rotational position between the support element and the spacer element, in particular wherein the spacer element and the support element are not configured to be rotatable relative to each other.

In an advantageous development, the spacer element has a sleeve-like design and has at least one guide slot, in which a guide pin of the support element engages and which delimits a guide path of the support element along the guide axis relative to the spacer element. In particular, a plurality of, in particular two, guide slots may be provided, which are arranged in a distributed manner over the circumference of the sleeve-shaped spacer element.

The guide slot may serve to relieve the load on the spacer element, which is arranged in the support element, and to increase the accuracy of the adjusting movement of the support element. Preferably, the guide slot and the guide pin are designed to cooperate so as to prevent the support element from disengaging from the spacer element. Preferably, the guide slot and the guide pin are designed to cooperate so as to prevent the support element and the spacer element from rotating relative to each other.

In an advantageous development, the spacer element has a sleeve-like design and, at one axial end, has two slots which are mutually offset around the circumference and have different slot depths. The stop element of the hollow bushing engages in one of the slots on the basis of the relative rotational position between the spacer element and the hollow bushing. This makes it possible, in a constructionally simple manner, to set the rotational-position-dependent first insertion depth of the spacer element in the hollow bushing.

As mentioned above, the invention also relates to a lifting platform, which is configured in particular as a vehicle lifting platform. The lifting platform according to the invention has at least one lifting column and a support arm, which is movable along a lifting axis of the lifting column and on which a support device according to the invention or an advantageous development thereof is arranged.

The lifting platform according to the invention makes it possible, in a constructionally simple manner, to adjust the height of the support devices arranged thereon. The hollow bushing is held on the support arm in a continuously adjustable manner. In particular, the hollow bushing may have an external thread and the support arm may have an internal thread corresponding thereto, so that at least the hollow bushing can be continuously adjusted relative to the support arm by means of a screwing movement along a screwing axis. When the support element is rotated relative to the hollow bushing, the support element can be adjusted in a stepwise manner relative to the hollow bushing and the support arm along the lifting axis. Moreover, arranging the support device on the support arm makes it possible to achieve substantially the same advantages already described with regard to the support device according to the invention and its advantageous developments. Preferably, the lifting platform has a plurality of support devices according to the invention or their advantageous developments.

BRIEF DESCRIPTION OF THE DRAWINGS

Further advantages of the invention are explained below with reference to an exemplary embodiment and the figures.

In the figures.

DETAILED DESCRIPTION

Figure 1:
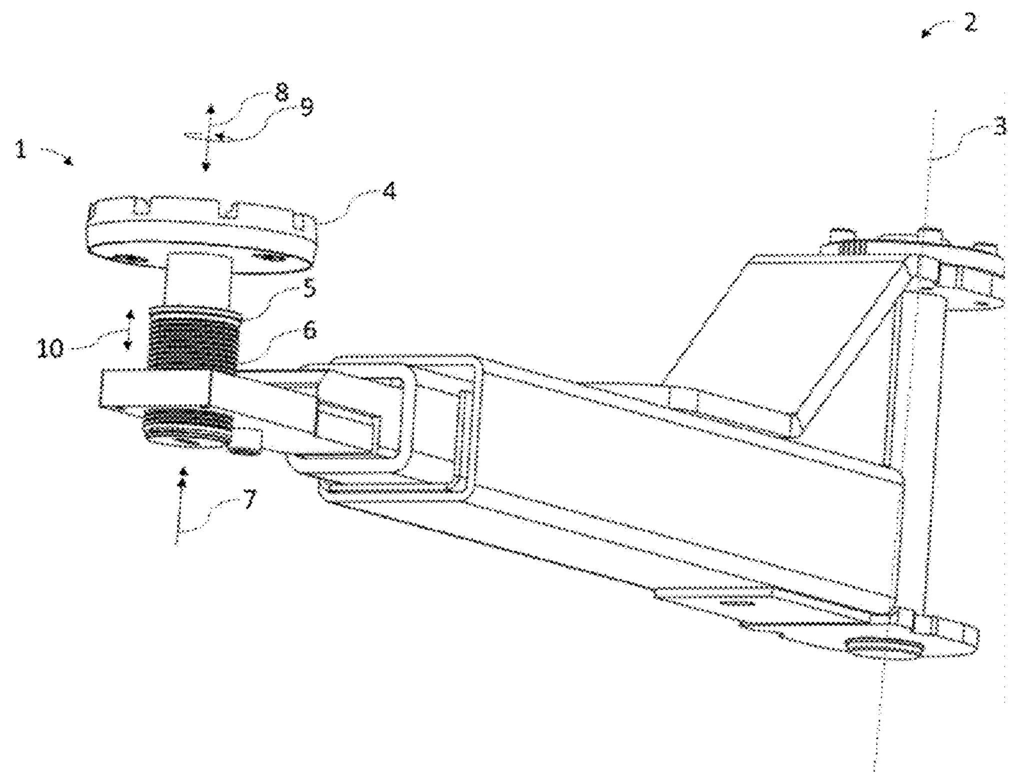
FIG. 1 shows the support device, which is located on a support arm of a lifting platform and in which a support element is inserted into a hollow bushing at a rotational-position-dependent insertion depth.

FIG. 1 shows a support device 1, which is arranged on a support arm 2 of a vehicle lifting platform. The lifting platform serves to move the support arm 2, together with the support device 1, parallel to a lifting axis 3. The support device 1 has a support element 4, which comprises a planar support plate and serves to lift a load (not shown here) into a desired position by means of a movement along the lifting axis 3, to hold the load in this position and to lower it again as required.

Since vehicles to be lifted by means of the vehicle lifting platform have different designs, it may be necessary to be able to adjust the height level of the support device 1 relative to the support arm 2. In order to be able to adjust the height rapidly and with little effort, the support device 1 shown in FIG. 1 can be adjusted both continuously and in a stepwise manner parallel to the lifting axis 3.

For continuous adjustment, the support device 1 has a hollow bushing 5 with an external thread 6. The external thread 6 serves, on the one hand, to allow the support device 1 to be fastened to the support arm 2 and, on the other hand, to effect continuous displacement of the hollow bushing 5 along a screwing axis 12 (c.f. FIG. 3) by means of a screwing movement 7. This allows the height of the hollow bushing 6, alone or together with the support element 4, to be adjusted substantially parallel to the lifting axis 3 and in a continuous manner, i.e., in an infinitely variable manner.

In addition, adjustments may also be carried out in a stepwise manner. For this purpose, the hollow bushing 5 has a cavity 14 (c.f. FIGS. 3A and 3B), which is configured to receive the support element 4 by means of a rectilinear insertion movement 8. Arranged in the cavity 14 is a stop element 15 (c.f. FIGS. 3A and 3B), which is designed in such a way that an insertion depth 10 of the support element 4 in the cavity 14 can be set in a stepwise manner on the basis of a relative rotational position between the support element 4 and the hollow bushing 5 about the insertion axis 13 (c.f. FIGS. 3A and 3B). In other words, the support element 4 can be removed as required from the cavity 14 of the hollow bushing 5, rotated relative to the hollow bushing 5 by means of a rotational movement 9 and reintroduced into the cavity 14. By rotating the support element 4 relative to the hollow bushing 5, the insertion depth 10 can be changed in a stepwise manner in such a way that it is possible to set an insertion depth 11 shown in FIG. 2, at which the support element 4 projects deeper into the cavity 14 of the hollow bushing 5 than in FIG. 1.

FIGS. 3A and 3B show the construction of the support device 1 which enables the continuous and stepwise adjustment described above to be achieved. The support device 1 shown in FIGS. 3A and 3B is the same support device 1 also shown in FIGS. 1 and 2. The view A-A in FIG. 3A is a first sectional view of the support device 1. View B-B in FIG. 3B is a second sectional view, rotated by 90 degrees thereto, of the support device 1.

Figure 2:
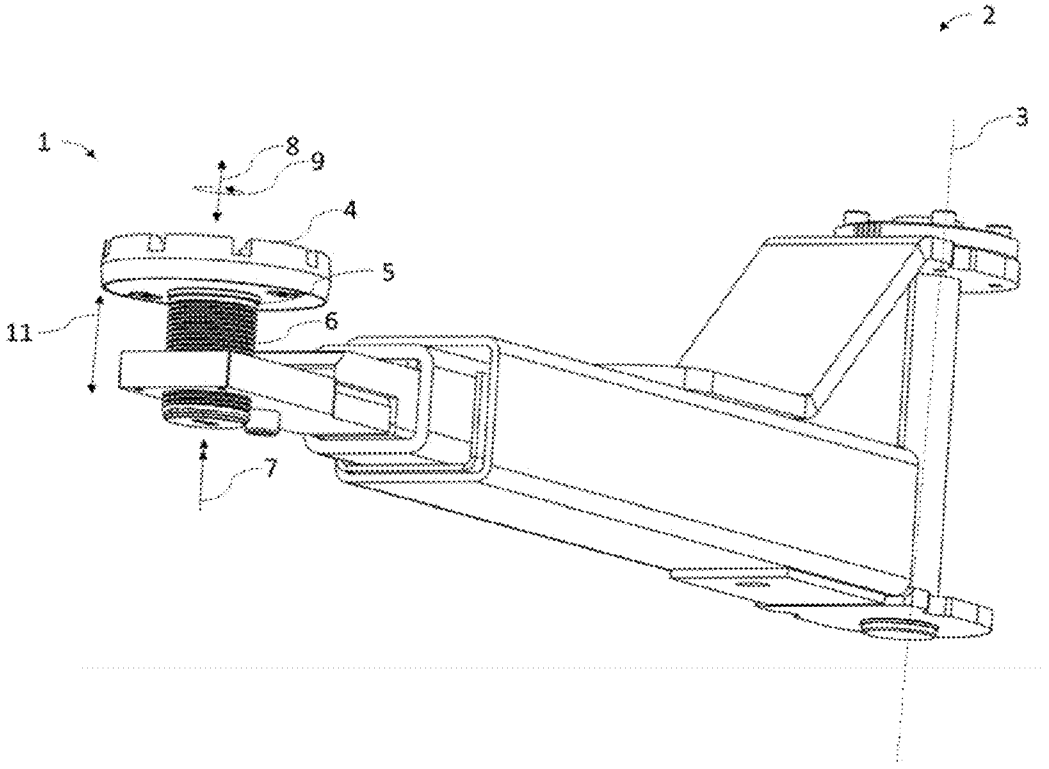
FIG. 2 shows the support device, which is located on the support arm of the lifting platform and in which a support element is inserted into a hollow bushing at a different rotational-position-dependent insertion depth.
Figure 3B:
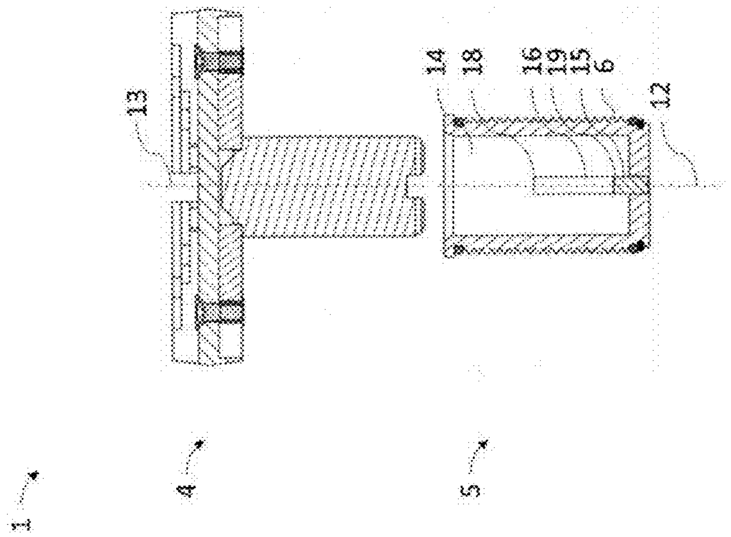
FIGS. 3A and 3B show two sectional views A-A and B-B of the support device.
Figure 3A:
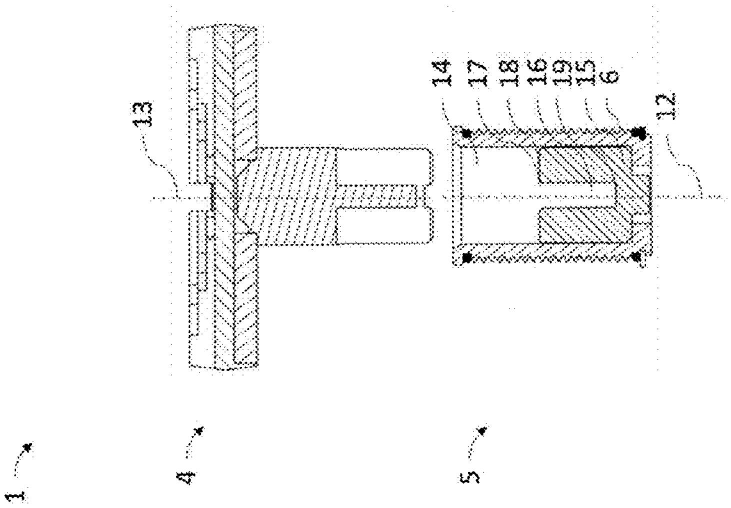

As already explained with regard to FIGS. 1 and 2, the support device 1 comprises a support element 4, which is designed to bear a load to be lifted, and also comprises a hollow bushing 5, which has an external thread 6, by means of which the hollow bushing 5 is fastenable to the lifting platform and is continuously adjustable along a screwing axis 12 by means of a screwing movement 7 (c.f. FIGS. 1 and 2). The hollow bushing 5 further has a cavity 14 in order to receive the support element 4 by means of the rectilinear insertion movement 8 (c.f. FIGS. 1 and 2) along an insertion axis 13 which, in the present case, runs parallel to the screwing axis 12. A stop element 15 arranged in the cavity 14 is designed in such a way that an insertion depth 10, 11 (c.f. FIGS. 1 and 2) of the support element 4 may be adjusted in a stepwise manner. The insertion depth 10, 11 depends on the relative rotational position between the support element 4 and the hollow bushing 5 about the insertion axis 13.

The stop element 15 has a recess 16. In a first relative rotational position, the support element 4 rests on the stop element 15 in the region of an edge of the recess 16. In a second relative rotational position, the support element 4 engages in the recess 16. In the arrangement shown in FIGS. 3A and 3B, the support element 4 is in the second rotational position relative to the hollow bushing 5.

The stop element 15 is essentially designed as a flat part, on the end face of which the recess 16 is arranged. The edge 17 of the recess 16 adjoins a first bearing surface 18 of the stop element 15. A bottom of the recess 16 forms a second bearing surface 19 of the stop element 15. The support element 4 is designed partially as a flat part which rests on the second bearing surface 19 in the second rotational position. In the first rotational position, the support element 4 rests on the first bearing surface 18.

The stop element 15 is configured as an interchangeable part and can be removed as required from the cavity 14 of the hollow bushing 5 and fitted therein again.

Figure 4:
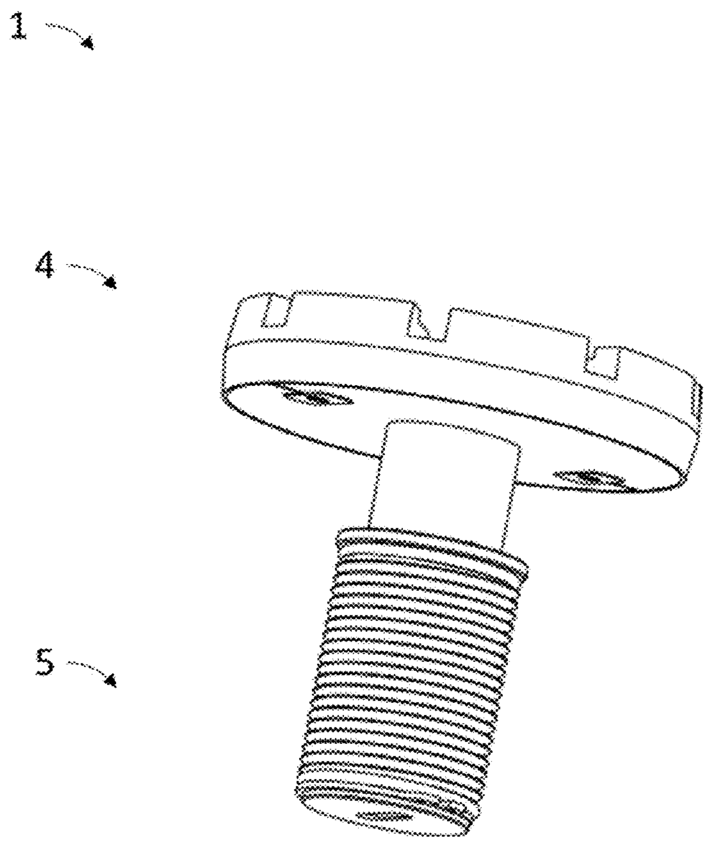
FIG. 4 shows the support device.

FIG. 4 shows the support device 1, which is also shown in FIGS. 1 to 3. The statements made with regard to FIGS. 1 to 3B therefore apply accordingly.

Figure 5:
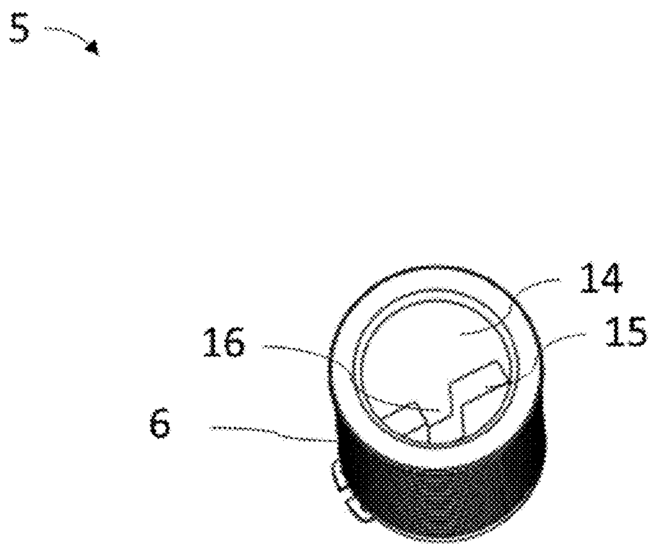
FIG. 5 shows the hollow bushing of the support device.

FIG. 5 shows the hollow bushing 5, with the cavity 14 and the spacer element 15 arranged therein with the recess 16, and also the external thread 6.

Figure 6:
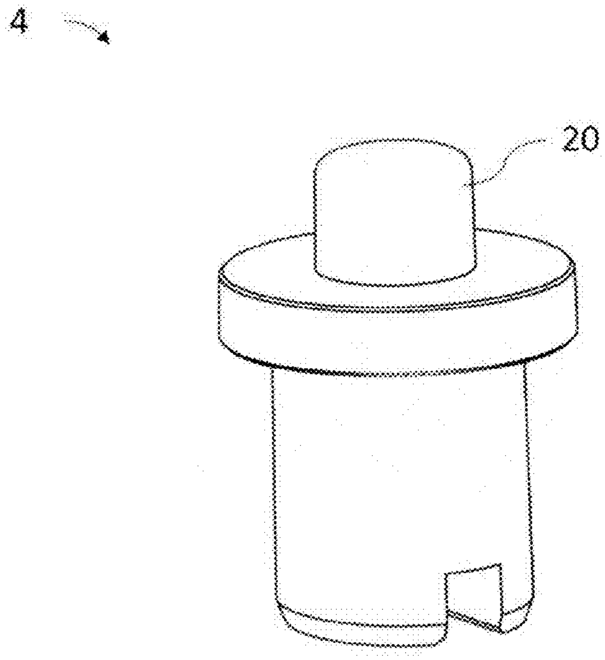
FIG. 6 shows a support mandrel.

FIG. 6 shows a support element 4 with a support mandrel 20. With the exception of the support mandrel 20, the support element 4 is configured in accordance with the support element 4 shown in FIGS. 1 to 4. The statements relating to FIGS. 1 to 4 therefore apply accordingly.

Figure 7:
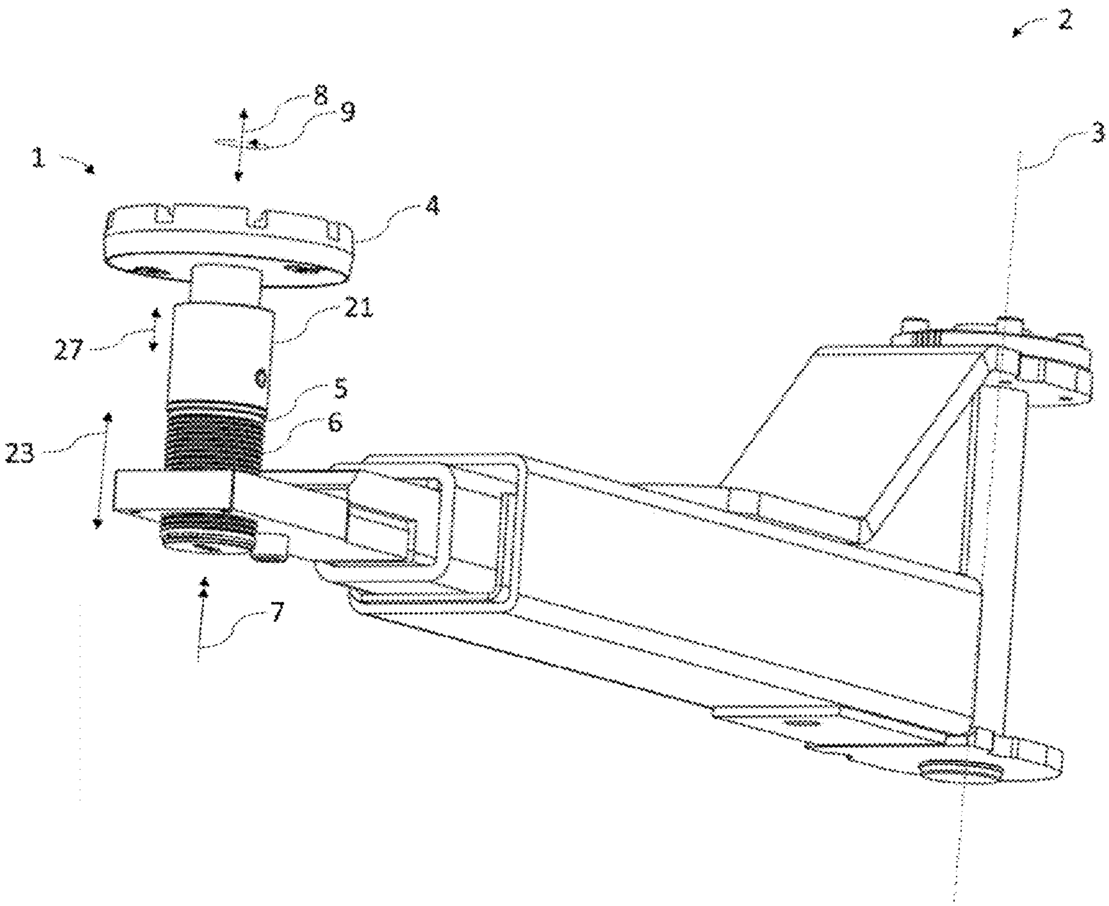
FIG. 7 shows the support device with a first embodiment of a spacer element arranged between the hollow bushing and the support element.

FIG. 7 shows a support device 1 comprising the same components as the support device 1 in accordance with FIGS. 1 and 2. In contrast to the arrangement in FIGS. 1 and 2, however, a spacer element 21 is arranged between the support element 4 and the hollow bushing 5. The spacer element 21 may additionally be used to adjust the support device 1 in a stepwise manner along the lifting axis 3.

Figure 8:
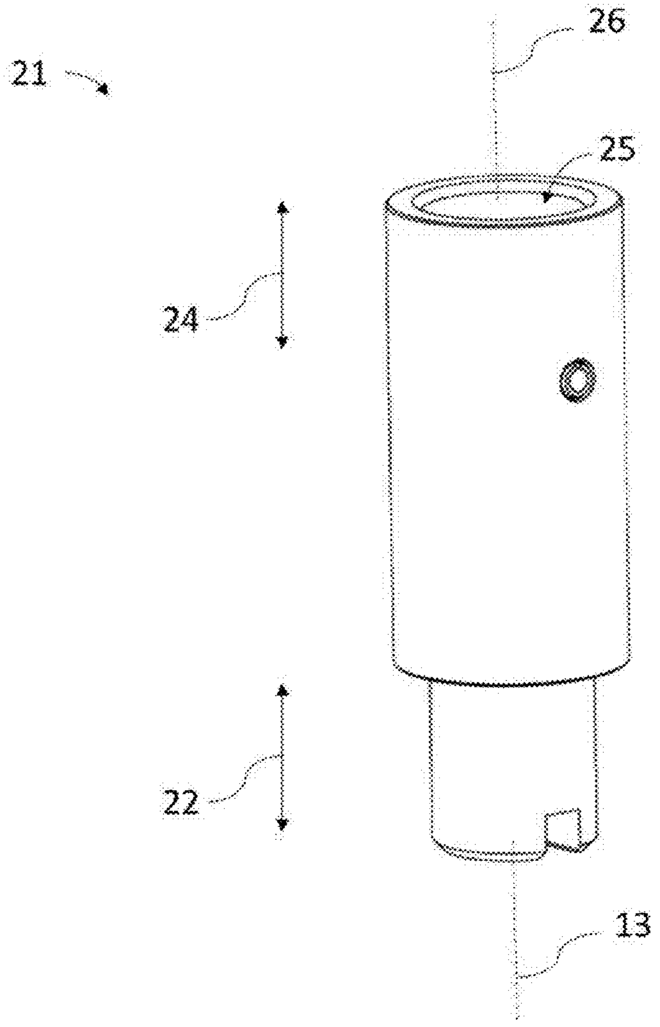
FIG. 8 shows the first embodiment of the spacer element.

As shown in FIG. 8, the spacer element 21 has an insertion portion 22 which is designed to be received in the cavity 14 of the hollow bushing 5 along the insertion axis 13, wherein the stop element 15 arranged in the cavity 14 is designed in such a way that a second insertion depth 23 (c.f. FIG. 7) of the insertion portion 22 in the cavity 14 can be set in a stepwise manner. The second insertion depth 23 is dependent on a relative rotational position between the support element 21 and the hollow bushing 5 about the insertion axis 13.

In the present case, the second insertion depth 23 of the insertion portion 22 in the hollow bushing 5 can be set in the same manner as the insertion depth 10, 11 of the support element 4 in the hollow bushing 5.

In addition, the spacer element 21 has a bushing portion 24 with a second cavity 25, in order to receive the support element 4 along a second insertion axis 26, wherein a second stop element (not shown) arranged in the second cavity 25 is arranged in such a way that a second insertion depth 27 (c.f. FIG. 7) of the support element 4 in the second cavity 23 can be set in a stepwise manner. The second insertion depth 2 is dependent on a relative rotational position between the support element 4 and the spacer element 21 about the second insertion axis 26.

In the present case, the second insertion depth 27 in the bushing portion 24 can be set in the same manner as the insertion depth 10, 11 of the support element 4 in the hollow bushing 5.

Figure 9B:
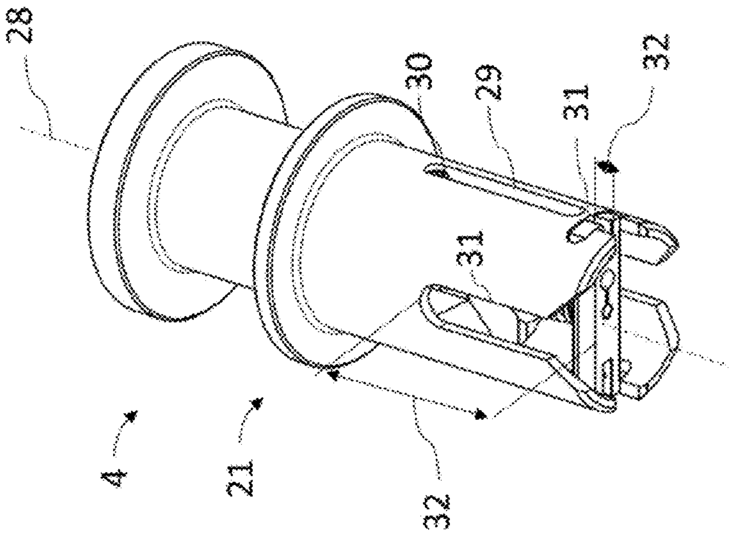
FIGS. 9A and 9B show views a) and b) of a second embodiment of the spacer element with a support element.
Figure 9A:
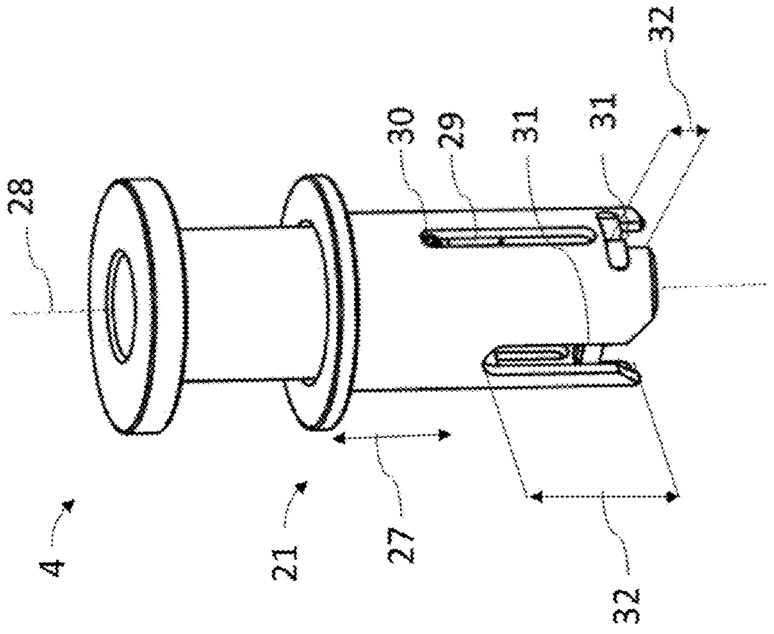

FIGS. 9A and 9B show a second embodiment of a spacer element 21 with a support element 4 in FIGS. 9A and 9B.

The support element 4 is designed in the manner already described for bearing a load to be lifted. The spacer element 21 serves, as likewise already described, to be arranged between the support element 4 and a hollow bushing (not shown). The hollow bushing maybe designed, for example, as discussed with regard to FIGS. 3A and 3B and may have a first cavity, in order to receive the spacer element 21 by means of a rectilinear insertion movement along a first insertion axis. A first stop element arranged in the first cavity is designed such that a first insertion depth of the spacer element 21 in the hollow bushing can be set in a stepwise manner and on the basis of a relative rotational position between the spacer element and the hollow bushing. The spacer element 21 has a second cavity, in order to receive the support element at a second insertion depth 27.

On an upper side, the support element 4 has a recess, in order to be able to receive, as required, a support member, which may take the form of a support plate or a form-fitting element, for example a support mandrel or a comparable support member.

Figure 10:
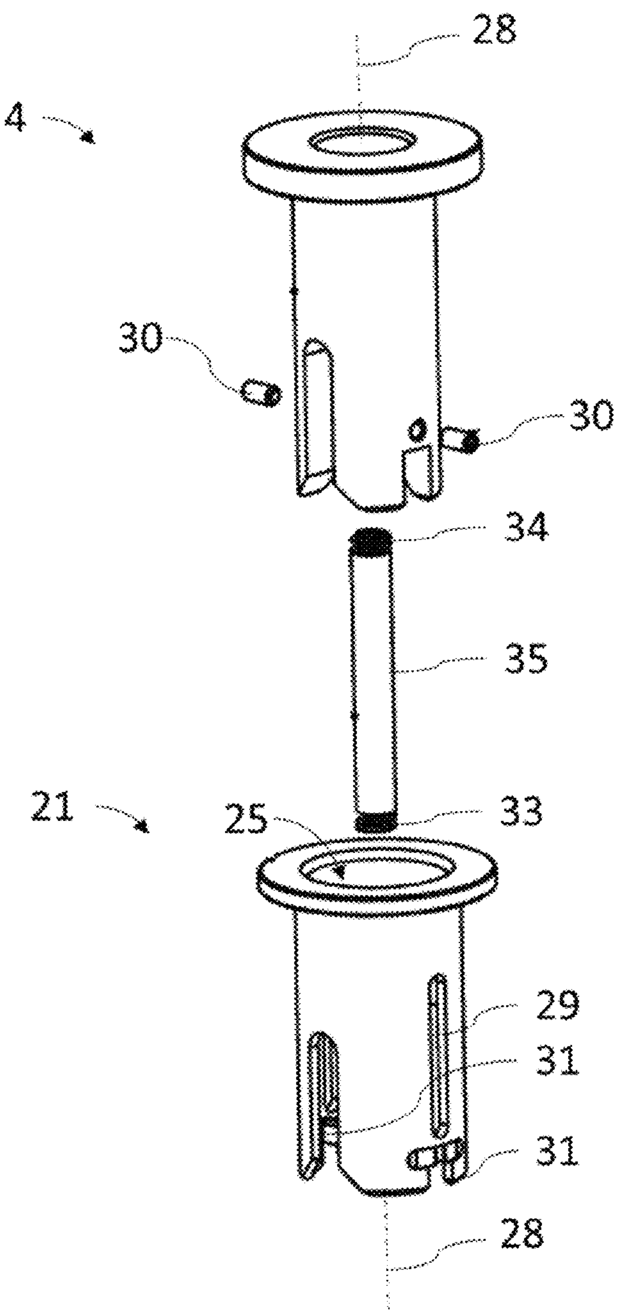
FIG. 10 shows an exploded view of the second embodiment of the spacer element with the support element.

As further shown in detail in FIGS. 10 and 11, the support element 4 is adjustably guided in the spacer element 21 along a guide axis 28. For this purpose, two spring elements are provided in order, in a tensioned state, to exert a spring force on the support element 4 along the guide axis 28. As a result, when the support device is lifted by means of the lifting platform, it is possible to establish contact between the support element and the load to be lifted even before the load is lifted. This makes it possible to check in a simple manner whether or not the support element is in the desired position. If the support element 4 has a support mandrel or another form-fitting support member, form-fitting contact can be established by means of the springs even before the lifting movement of the load, this form-fitting contact enabling the lifting movement to be carried out in a particularly safe manner. In particular, this allows legal provisions relating to lifting platforms for vehicles to be implemented in a particularly uncomplicated manner, since these provisions frequently require a form fit of this type.

As shown in both FIGS. 9A and 9B, the support element 4 has a sleeve-like design and has two guide slots 29, in each of which a guide pin 30 of the support element 4 engages and delimits a guide path of the support element along the guide axis 28 relative to the spacer element 21.

At an axial end pointing away from the support element 4, the spacer element 21 has two slots 31 which are mutually offset around the circumference and have different slot depths 32. When the spacer element 21 is arranged in the hollow bushing, the stop element arranged in the hollow bushing engages in one of the slots on the basis of the relative rotational position between the spacer element 21 and the hollow bushing 5, thereby making it possible to set the first insertion depth.

FIG. 10 shows an exploded view of the second embodiment of the spacer element 21 with the support element 4. To avoid repetition, reference is made to the statements relating to FIGS. 9A and 9B. As explained with regard to FIG. 9 and as shown in FIG. 10, arranged between the spacer element 21 and the support element 4 are two spring elements 33, 34, which are mechanically coupled with one another by means of a force transmission element 35. In the tensioned state, the spring elements 33, 34 serve to exert a spring force on the support element 4 along the guide axis 28.

Figure 11A:
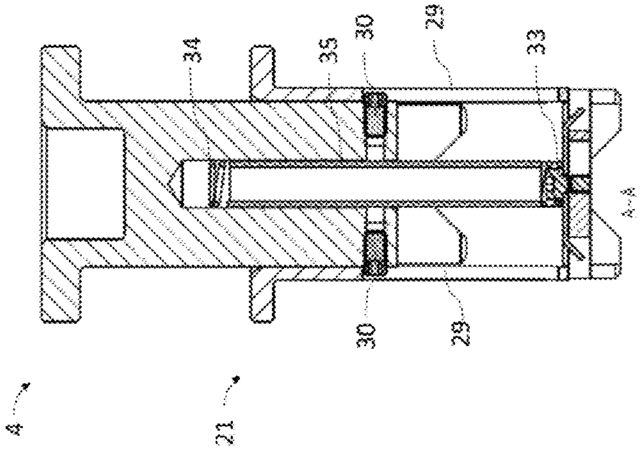
FIGS. 11A and 11B show two sectional views A-A and B-B of the second embodiment of the spacer element with the support element.
Figure 11B:
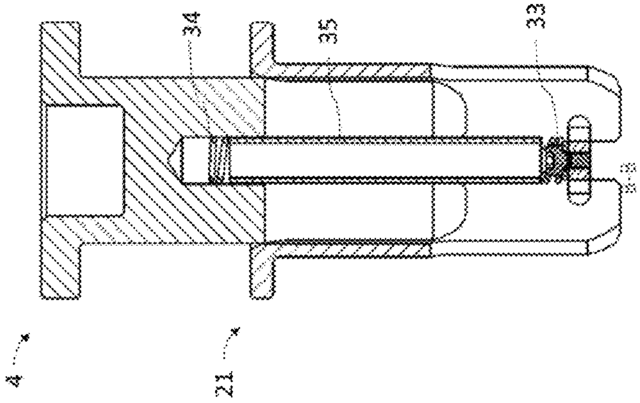

FIGS. 11A and 11B show the second embodiment of the spacer element 21 in the sectional views A-A and B-B, which are rotated by 90 degrees to each other. The explanations concerning FIGS. 9A to 10 apply accordingly.

The invention claimed is:

1. A support device (1) for a lifting platform, the support device comprising:

a support element (4), which is designed to bear a load to be lifted;

a hollow bushing (5), which is fastenable on an outer side to the lifting platform in a continuously adjustable manner;

the hollow bushing (5) has a cavity (14), in order to receive the support element (4) via a rectilinear insertion movement (8) along an insertion axis (13); and a stop element (15) arranged in the cavity (14) that is configured such that an insertion depth (10, 11) of the support element (4) in the hollow bushing (5) is settable in a stepwise manner and the insertion depth (10, 11) is dependent on a relative rotational position between the support element (4) and the hollow bushing (5) about the insertion axis (13).

2. The support device (1) as claimed in claim 1, wherein the outer side of the hollow bushing (5) has an external thread (8), by which the hollow bushing (5) is fastenable to the lifting platform in a continuously adjustable manner with a screwing movement.

3. The support device (1) as claimed in claim 1, wherein the stop element (15) has a recess (16), wherein the support element (4), in a first relative rotational position, rests on the stop element (15) in a region of an edge (17) of the recess (16) and, in a second relative rotational position, engages in the recess (16).

4. The support device (1) as claimed in claim 3, wherein the stop element (15) is at least partially a flat part, on an end face of which the recess (16) is arranged, wherein the edge (17) of the recess (16) adjoins a first bearing surface (18) of the stop element (15) and a second bearing surface (19) of the stop element is formed at a bottom of the recess (16), wherein the support element (4), in the first relative rotational position, rests on the first bearing surface (18) and, in the second relative rotational position, engages in the recess (16) and rests on the second bearing surface (19).

5. The support device (1) as claimed in claim 1, wherein the support element (4) and the stop element (15) are rotated by 90 degrees relative to each other between the first and second rotational positions.

6. The support device (1) as claimed in claim 1, wherein the stop element (15) is interchangeably arranged in the cavity (14).

7. The support device (1) as claimed in claim 1, wherein the support element (4) is interchangeable.

8. The support device (1) as claimed in claim 1, wherein the support element comprises a support member, which is detachably connectable to the support element.

9. The support device (1) as claimed in claim 8, wherein the support member comprises at least one of a support plate, a form-fitting element, or a support mandrel (20).

10. A lifting platform, comprising at least one lifting column and a support arm (2), which is movable along a lifting axis (3) of the lifting column and has an internal thread on which a support device (1) as claimed in claim 1 is adjustably arranged.

11. A support device (1) for a lifting platform, the support device comprising:

a support element (4), which is designed to bear a load to be lifted;

a hollow bushing (5), which is fastenable on an outer side to the lifting platform in a continuously adjustable manner;

a spacer element (21), which is adapted to be arranged between the support element (4) and the hollow bushing (5);

the hollow bushing (5) has a first cavity (14), in order to receive the spacer element via a rectilinear insertion movement along a first insertion axis (12), wherein a first stop element (15) arranged in the first cavity (14) is configured such that a first insertion depth (10, 11) of the spacer element (4) in the hollow bushing (5) is settable in a stepwise manner and the first insertion depth (10, 11) is dependent on a relative rotational position between the spacer element (4) and the hollow bushing (5);

and the spacer element (21) has a second cavity (25), in order to receive the support element (4) at a second insertion depth (27).

12. The support device as claimed in claim 11, wherein the second cavity (25) is adapted to receive the support element (4) along a second insertion axis (26), a second stop element arranged in the second cavity (25) is configured such that the second insertion depth (27) of the support element (4) in the second cavity (25) is settable in a stepwise manner and the second insertion depth (27) is dependent on a relative rotational position between the support element (4) and the spacer element (21) about the second insertion axis (26).

13. The support device (1) as claimed in claim 11, wherein the support element (4) is adjustably guided in the spacer element (21) along a guide axis (28) and at least one spring element (33, 34) is provided in order, in a tensioned state, to exert a spring force on the support element (4) along the guide axis (28).

14. The support device (1) as claimed in claim 13, wherein the spacer element (4) is sleeve-shaped and has at least one guide slot (29), in which a guide pin (30) of the support element (4) engages and delimits a guide path of the support element (4) along the guide axis (28) relative to the spacer element (21).

15. The support device (1) as claimed in claim 11, wherein the spacer element (21) is sleeve-shaped and, at one axial end, has two slots (31) which are mutually offset around a circumference and have different slot depths (32), wherein the first stop element (15) of the hollow bushing engages in one of the slots (31) based on the relative rotational position between the spacer element (21) and the hollow bushing (5).

* * * * *